United States Patent
Johansson et al.

(10) Patent No.: US 8,096,562 B2
(45) Date of Patent: Jan. 17, 2012

(54) PRESSURE SEALING MEANS FOR A CABLE TRANSIT

(75) Inventors: Bengt Johansson, Karlskrona (SE); Bo Birgerud, Höllviken (SE)

(73) Assignee: MCT Brattberg Aktiebolag (SE)

( * ) Notice: Subject to any disclaimer, the term of this patent is extended or adjusted under 35 U.S.C. 154(b) by 392 days.

(21) Appl. No.: 12/309,539

(22) PCT Filed: Jul. 20, 2006

(86) PCT No.: PCT/SE2006/050270
§ 371 (c)(1),
(2), (4) Date: Jun. 24, 2009

(87) PCT Pub. No.: WO2008/010755
PCT Pub. Date: Jan. 24, 2008

(65) Prior Publication Data
US 2009/0315273 A1 Dec. 24, 2009

(51) Int. Cl.
*F16J 15/02* (2006.01)

(52) U.S. Cl. .......... 277/630; 277/640; 174/40 CC; 285/338; 403/293

(58) Field of Classification Search ............ 277/606, 277/621, 640, 619, 630; 174/40 CC, 653, 174/655, 68.1; 285/338, 341, 348, 369; 403/293, 403/297, 299, 303, 312, 314, 374.1, 374.4
See application file for complete search history.

(56) References Cited

U.S. PATENT DOCUMENTS

| | | | | |
|---|---|---|---|---|
| 569,247 | A * | 10/1896 | Amith | 285/59 |
| 3,282,544 | A * | 11/1966 | Brattberg | 248/56 |
| 5,899,319 | A * | 5/1999 | Jarnagin | 198/666 |
| 5,993,102 | A * | 11/1999 | Miyako | 403/370 |
| 6,056,472 | A * | 5/2000 | Latulippe et al. | 403/301 |

FOREIGN PATENT DOCUMENTS

| | | |
|---|---|---|
| EP | 1 484 541 A1 | 12/2004 |
| JP | 62-209296 A | 9/1987 |
| JP | 09-107189 | 4/1997 |
| WO | WO-96/11353 A1 | 4/1996 |

OTHER PUBLICATIONS

Office Action has been issued in the corresponding Japanese Patent application No. 2009-520703, mailingdate Apr. 5, 2011.

* cited by examiner

*Primary Examiner* — Vishal Patel
(74) *Attorney, Agent, or Firm* — Lerner, David, Littenberg, Krumholz & Mentlik, LLP

(57) ABSTRACT

The claimed invention relates to a pressure sealing means (20) for a cable transit (10). The pressure sealing means (20) comprises two wedge shaped pressure applying elements (21) placed vertically opposite each other with their acute sides facing towards each other and two wedge-shaped tensioning elements (22) placed horizontally with their acute sides facing each other. The pressure sealing means (20) further comprises at least one tensioning member (23) arranged between the two tensioning elements (22). The tensioning member (23) is at least one screw (24) secured in axial direction by a securing means (25) in the pressure applying elements (21) and provided with a right hand thread on one side of the securing means (25) and a left hand thread on the opposite side of the securing means (25).

6 Claims, 4 Drawing Sheets

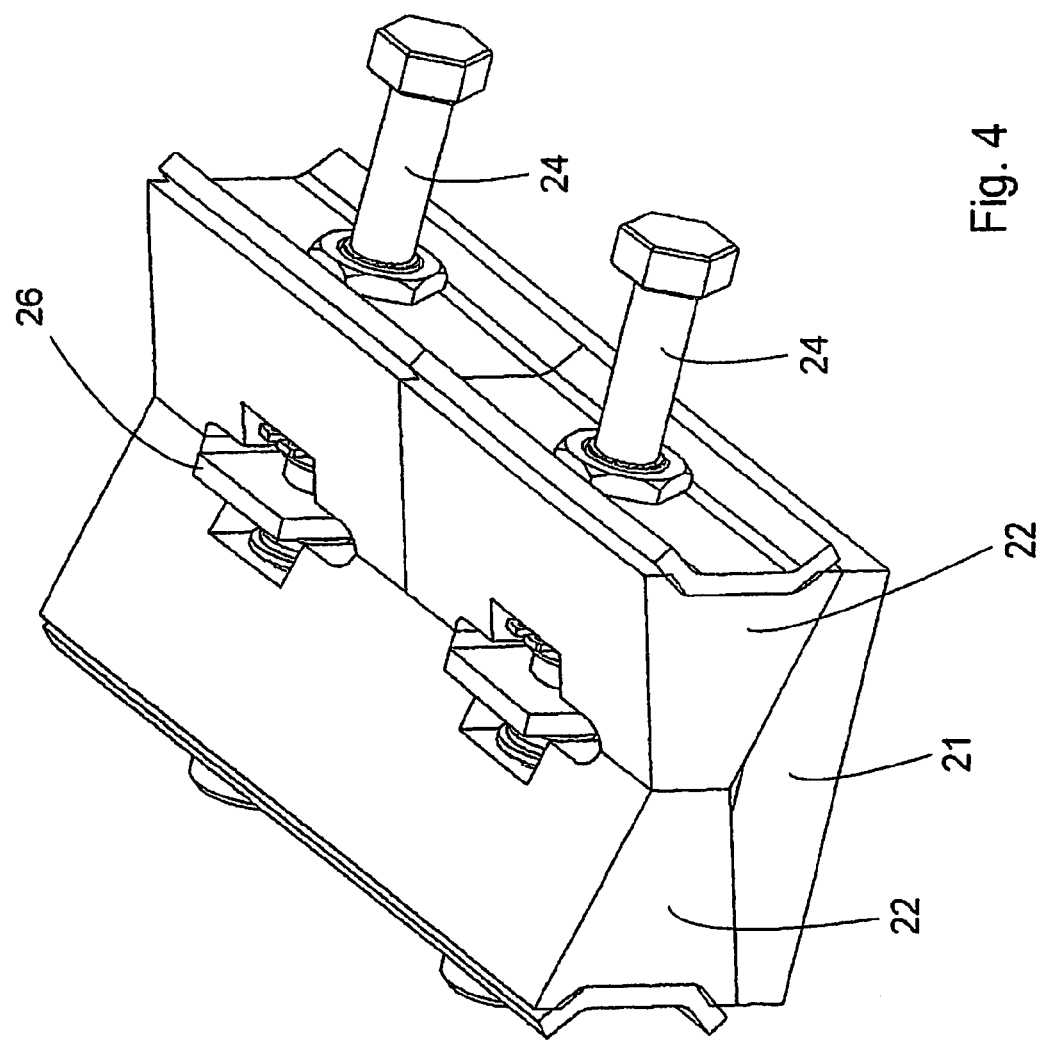

PRESSURE SEALING MEANS FOR A CABLE TRANSIT

CROSS-REFERENCE TO RELATED APPLICATIONS

The present application is a national phase entry under 35 U.S.C. §371 of International Application No. PCT/SE2006/050270 filed Jul. 20, 2006, published in English, the disclosure of which is incorporated by reference herein.

TECHNICAL FIELD OF THE INVENTION

The claimed invention relates to a pressure sealing means for a cable transit.

BACKGROUND OF THE INVENTION

Sealing systems for cables and pipes are required in several different applications, for example in ships, offshore industry and buildings, in case of accidents like a fire, an explosion or liquid leaking structures in order to protect important components, areas, lives as well as to delay the spread of fire or leaking water. Sealing systems for cables and pipes are therefore frequently used in several applications in order to protect cable and pipe transits.

Each sealing system comprises a frame secured in a partition wall. The frame material is selected to meet the specific requirement for that particular sealing. The material should be a strong and resistant material, preferably steel or aluminum, and the size of the frame is selected from the number of cables, the dimensions of the cables and the size available in the partition wall.

Each cable in the cable transit is surrounded by an inset block, normally made of two identical sections. Each section is provided with a half cylindrical groove with a diameter that matches the diameter of the cable so that the two sections fit around the cable when put together. The cables and the insert blocks are stored within the frame. A metallic plate provided with protruding flanges that keeps the insert blocks in the right transverse position in the frame is placed between each layer of insert blocks within the frame in order to secure each layer in the frame.

Somewhere within the frame is at least one pressure sealing means placed. The pressure sealing means is, when tensioned, applying a pressure on the inset blocks within the frame so that gaps between the insert blocks and the cables are sealed. The size of the insert blocks are selected to fill the interior width of the frame completely when packed side by side.

One known pressure sealing means comprises two pressure applying wedge-shaped elements placed vertically opposite each other with their thin end facing towards each other, and two tensioning elements that also are wedge-shaped but placed horizontally opposite each other with their thin ends facing towards each other so that flat sides opposite the thin end of the pressure applying elements and the tensioning elements, when placed together, generates a rectangular shaped pressure sealing means.

In order to be able to apply the necessary pressure on the insert blocks within the frame are the tensioning elements connected to each other by at least one treaded screw that extends through the tensioning elements. In one end of the screw is a nut provided so that the two tensioning elements are moved towards each other when the screw is rotated clockwise, and away from each other when it is rotated counter-clockwise. The movement of the two elements towards each other will, as a result of the wedge-shape, force the pressure applying elements away from each other so that the total height of the pressure sealing element is increased. The increased height will consequently apply a pressure on the insert blocks within the frame so that the cable transit is finally sealed. The two pressure applying elements are connected to each other by two small helical springs so that the different elements in the sealing means are held together.

This sealing means however has several drawbacks. One of the drawbacks is that when the final sealing means is inserted in the remaining gap, only slightly larger than the height of the final sealing means, does the pressure applying elements slide sideways in relation to the tensioning elements which, because of the wedge-shaped elements, makes the pressure applying elements turn sideways. This sideways movement, unfortunately, increases the height of the final sealing means and thereby makes it even more difficult to insert it in the gap.

Secondly, if there is a need for modification of the number or types of cables passing through the transit is the final sealing means is the tension applied by the final sealing means released so that the insert blocks could be changed or replaced. The pressure from final sealing means is released by unscrewing the screws and moving the tensioning elements away from each other so that the pressure applying elements are returned to the same position they had before the transit was finally sealed. The two tensioning elements are however not moved similarly when the screws are unscrewed. What happens is that only one of the tensioning elements, normally the one closest to the screw head, moves while the other one remains in the tensioned position within the frame because of friction between the elements in contact with each other. This drawback consequently makes it complicated dismantle the cable transit.

The objective problem for the claimed invention is to provide a pressure sealing means that is easily fitted in and dismantled from the cable transit.

One known solution to overcome the disclosed drawbacks is presented in EP 0 786 061 B1. The pressure sealing means disclosed does however suffer from other drawbacks. One of them is that it is complicated and thereby expensive to manufacture since all wedge-shaped elements and the flexible straps are manufactured in one piece. Another drawback is that if someone of the wedge-shaped elements or the flexible straps is damaged must the entire component be replaced which is costly for the user.

There is consequently still a need for an improved pressure sealing means.

SUMMARY OF THE INVENTION

The claimed invention provides a pressure sealing means of the type described above. In order to overcome the described drawbacks is the pressure sealing means provided with a tensioning member comprising at least one screw secured in axial direction by a securing means in the pressure applying elements and provided with a right hand thread on one side of the securing means and a left hand thread on the opposite side of the securing means.

The securing means maintain the correct position of the pressure applying elements in relation to the tensioning members which facilitates the introduction of the pressure sealing means into the frame. The combination of a right and a left hand thread on the screw on the opposite sides of the securing means ensures uniform movement of both tensioning members in relation to the pressure applying members when the screw is tensioned or unscrewed and thereby forcing both tensioning members uniformly from one position to another.

The claimed invention solves the described drawbacks and is easy to manufacture and repair since all different parts of the pressure sealing means are manufactured separately before they are put together.

BRIEF DESCRIPTION OF THE DRAWINGS

One embodiment of the claimed invention is illustrated in the drawings.

FIG. 4. Illustrates a perspective view of the claimed pressure sealing means with the top pressure applying element removed. The pressure sealing means is tensioned and the two tensioning elements in their final sealing position

DETAILED DESCRIPTION

Figure 1:
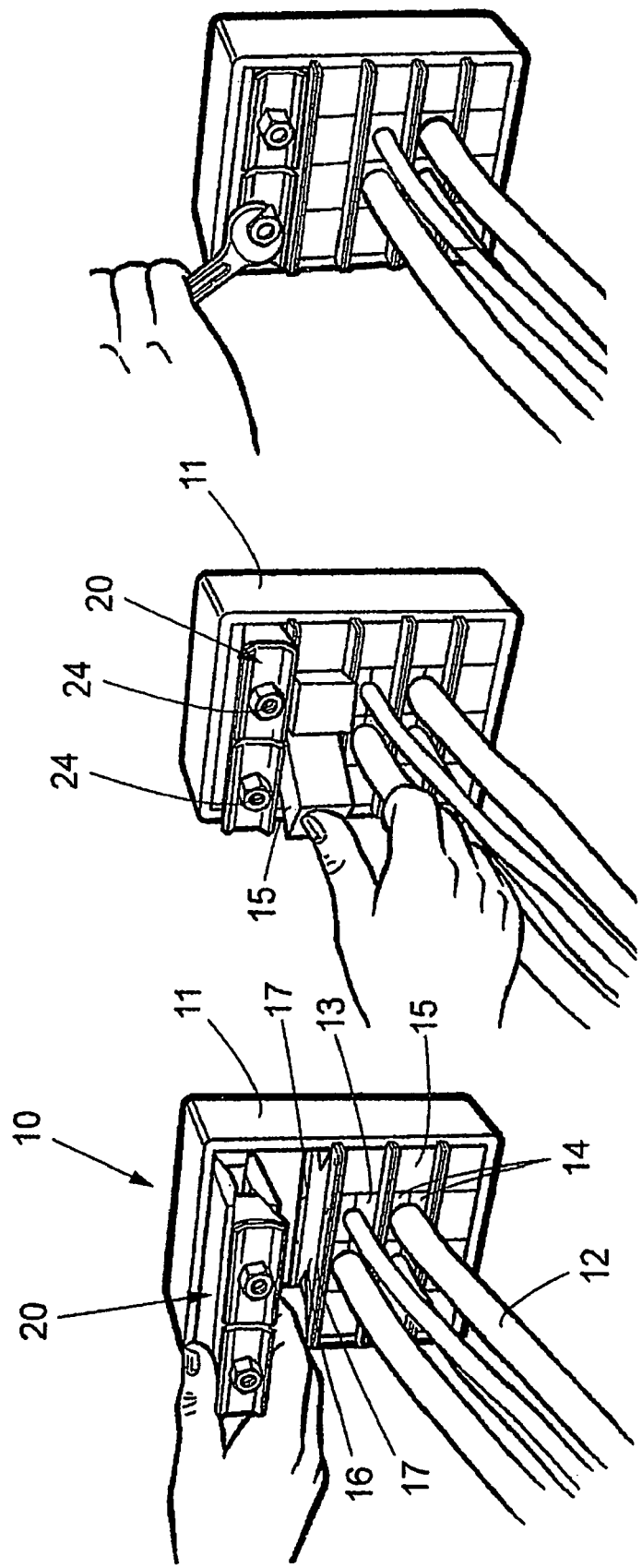
FIG. 1a-c. Illustrates cable transit at different steps during the assembling procedure.

In FIG. 1a-c is a cable transit 10 illustrated. The cable transit comprises a frame 11 normally made of a metal like steel or aluminum. A number of cables 12 are extending through the frame 11 and the size of the frame 11 is selected from the number of cables passing through the wall and the size available in the partition wall that the frame 11 is mounted in. Each cable 12 is surrounded by a rectangular insert block 13. Each insert block 13 surrounding a cable 12 is divided into two identical sections 14 provided with a half-cylindrical groove in order to make room for the cable. Each cable diameter required an insert block 13 with a similarly sized groove to ensure a complete sealing around the cable 12. If the flame not is completely filled with cables 12 and the surrounding insert blocks 13 are the remaining openings filled by homogeneous blocks 15. Each layer of insert blocks 13 or homogeneous blocks 15 are separated by a plate 16 extending from one side of the frame 11 to the opposite side of the frame 11. The plate 16 is provided with protruding edges 17 to keep the insert blocks 13 and the homogeneous blocks 15 in the right position between the edges 17. One row within the flame 11 is used for a pressure sealing means 20. The pressure sealing means 20 is inserted within the flame 11 before the last layer of insert blocks 13 or homogeneous blocks 15 as disclosed in FIG. 1a, but could also be inserted when all insert blocks 13 or homogeneous blocks 15 are in the right position within the frame 11. When all cables 12, insert blocks 13, homogeneous blocks 15 and pressure sealing means 20 is in the right position within the frame 11 is the pressure sealing means 20 tensioned by screwing the two screws 24 extending through the entire pressure sealing means. On the opposite side of the pressure sealing means is the screw provided with a not illustrated nut. When the screw 24 is tensioned is a pressure applied on the insert blocks 13 and homogeneous blocks 15 within the frame 11 to seal all gaps between the cables 12, the insert blocks 13, the homogeneous blocks 15 and the flame 11, as disclosed in FIG. 1c.

Figure 2:
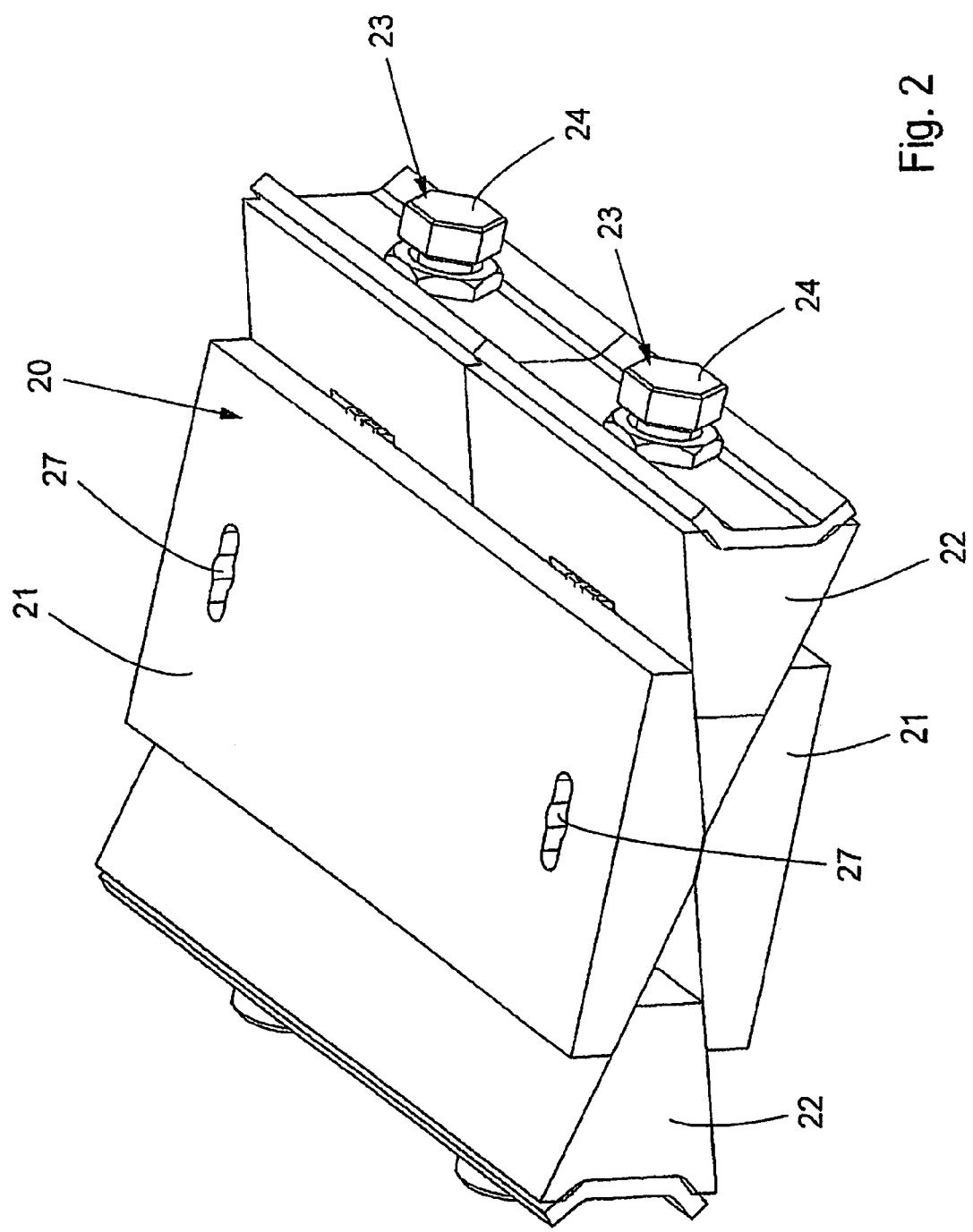
FIG. 2. Illustrates the pressure sealing means with all four wedge-shaped elements in the right position relative to each other before tension is applied.
Figure 3:
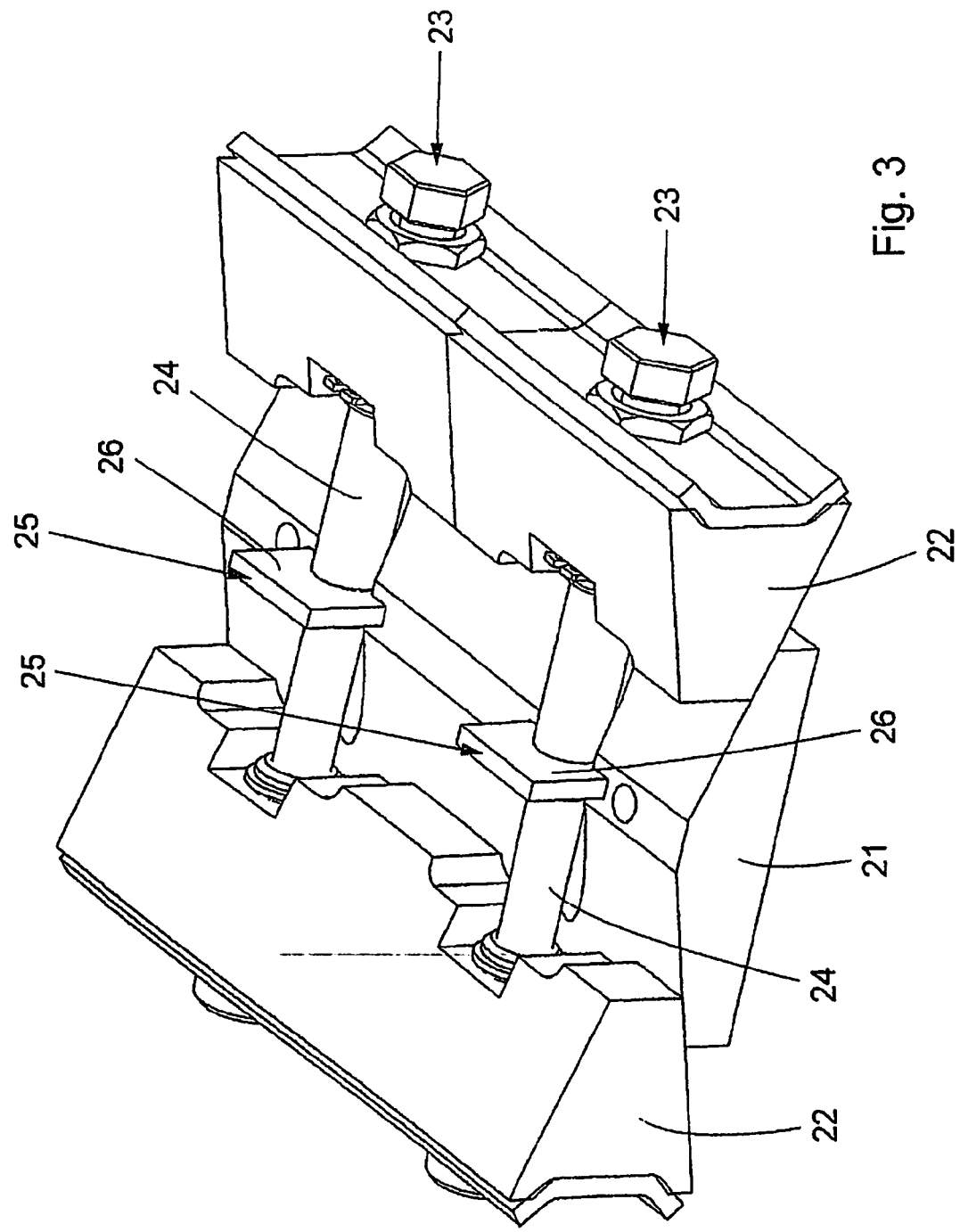
FIG. 3. Illustrates a perspective view of the claimed pressure sealing means with the top pressure applying element removed before tensioning of the pressure sealing means.

In FIG. 2 is a pressure sealing means 20 disclosed. The pressure sealing means 20 comprises two wedge-shaped pressure applying elements 21 placed vertically opposite each other with their acute sides facing each other and two wedge-shaped tensioning elements 22 placed horizontally opposite each other with their acute sides facing towards each other. The side of the pressure applying elements 21 opposite the acute side is substantially flat and horizontal to provide proper alignment to the frame 11 and the plate 16. The length of the pressure sealing means 20 is either selected to fill the entire width of the frame 11 or if the frame is large, a number of sealing means 20 could be used. The width of the pressure applying elements 21 is similar to the length of the insert blocks 13 and the homogeneous blocks 15. The length of the tensioning elements 22 is similar to the length of the pressure applying elements 21. The tensioning elements 22 could be divided into more than one element but the total length of these elements is substantially similar to the length of the pressure applying elements 21. The thickness of the pressure applying elements 21 and the tensioning elements 22 is selected so that the total height of the pressure sealing means 20 when not tensioned is slightly smaller that the height of the insert blocks 13 and the homogeneous blocks 15

The pressure sealing means 20 further comprises at least one, in the disclosed embodiment two, tensioning members 23 arranged between the two tensioning elements 22. The tensioning member 23 consists of a screw 24 that extends between the two tensioning elements 22 and a nut in the end of the screw 24. When the screw 24 is rotated are the two tensioning elements 22 moved towards each other witch, as a result of the wedge shaped pressure applying elements and tensioning elements, will force the two pressure applying elements away from each other. The total height of the pressure sealing means is consequently increased and a pressure applied on insert blocks 13 and homogeneous blocks 15 within the frame 11.

In figure is one of the pressure applying elements 21 removed to disclose the tensioning member 23. The screw 24 is secured in axial direction relation to the pressure applying elements 22 by a securing means 25. The securing means 25 is a plate-shaped metallic component 26 that extends between the two pressure applying elements 21. The length of the plate-shaped metallic component 26 is selected so that is extend into a cut-out portion in both pressure applying elements 21 to be locked in axial direction in relation to the pressure applying elements 21. The screw 24 is provided with a groove that extends around the circumference of the screw 24. The plate-shaped metallic component 26 is provided with a recess for the screw. The recess has a diameter correlating to the screw diameter in the groove in order to secure the screw 24 in axial direction to the pressure applying elements 21. The screw 24 has a right hand tread on one side of the securing means 25 and a left hand tread on the opposite side. When the screw 24 is rotated will the left and right hand tread force the two wedge-shaped tensioning elements 22 to move simultaneously towards or away from the securing means 25 depending on the direction rotation. This ensures that the same pressure is applied on the entire contact surface between the pressure sealing means 20, the insert blocks 13 and the homogeneous blocks 15 within the frame 11 and that both tensioning elements 22 are moved in relation to the pressure applying elements 21 when the pressure sealing means 20 is demounted.

FIG. 4 illustrates the position of a pressure applying element 21 and the tensioning elements 22 (one pressure applying element is not included in the figure) when the pressure sealing means (20) is tensioned.

The tensioning elements 21 are held together by the tensioning means 23. In order to secure the two pressure applying elements to the tensioning elements 22 and the tensioning means 23 are two helical springs extending between the two pressure applying elements 21. The springs are not disclosed in the figures. The springs are secured in similar hubs 27 in the two pressure applying elements 21.

The invention claimed is:

1. Pressure sealing means for a cable transit, said means comprises;
    two wedge shaped pressure applying elements (21) placed vertically opposite each other with their acute sides facing towards each other;
    two wedge-shaped tensioning elements placed horizontally opposite each other between the pressure applying elements with their acute sides facing each other, at least one tensioning member arranged between the two tensioning elements; and
    the tensioning member comprising at least one screw secured in the axial direction by a securing means in the pressure applying elements and provided with a fight hand thread on one side of the securing means and a left hand thread on the opposite side of the securing means.

2. Pressure sealing means according to claim 1, the screw extending through and between the tensioning members.

3. Pressure sealing means according to claim 1, the securing means comprising a plate-shaped metallic component secured in the axial direction in the two pressure applying elements.

4. Pressure applying means according to claim 3, the plate shaped metallic component being secured in the pressure applying elements by entering a cut-out portion in the pressure applying dements.

5. Pressure sealing means according to claim 4, the screw being provided with a groove around the circumference of the screw and that the plate-shaped metallic component is being placed in that groove to secure the screw in the axial direction.

6. Pressure sealing means according to claim 5, the securing means being placed substantially in the center of the screw and the pressure applying elements.

\* \* \* \* \*

UNITED STATES PATENT AND TRADEMARK OFFICE
CERTIFICATE OF CORRECTION

| | | |
|---|---|---|
| PATENT NO. | : 8,096,562 B2 | Page 1 of 2 |
| APPLICATION NO. | : 12/309539 | |
| DATED | : January 17, 2012 | |
| INVENTOR(S) | : Bengt Johansson and Bo Birgerud | |

It is certified that error appears in the above-identified patent and that said Letters Patent is hereby corrected as shown below:

On the Title Page item [57], ABSTRACT, line 3, "wedge shaped" should read –wedge-shaped–.

In the Specifications:

Column 1, line 36, "half cylindrical" should read –half-cylindrical--.
Column 1, line 48, delete "are" and insert therefor --is--.
Column 1, line 58, "generates" should read –generate--.
Column 1, line 61, delete "are"; following "frame" insert --,--
Column 1, line 62, before "connected" insert –are--; delete "treaded" and insert therefor --threaded--.
Column 2, line 12, delete "does".
Column 2, line 19, after "transit" insert --,--; delete "is".
Column 2, line 22, after "from" insert –the--.
Column 2, line 32, after "complicated" insert –to--.
Column 2, line 43, delete "someone" and insert therefor –one--.
Column 2, line 44, "damaged must the entire component be" should read –the entire component must be--.
Column 2, line 53, "is the pressure sealing means" should read –the pressure sealing means is--.
Column 3, line 10, "FIG. 1 a-c. Illustrates" should read –FIGS. 1 a-c. Illustrate--.
Column 3, line 22. after "position" insert --.--.
Column 3, line 37, "not is" should read –is not--.
Column 3, line 38, delete "are" and insert therefor --,--.
Column 3, line 40, delete "are" and insert therefor –is--.
Column 3, line 52, delete "is" (first instance) and insert therefor –are--; delete "is" (second instance).
Column 3, line 53, after "20" insert –is--.
Column 3, line 57, after "tensioned" delete "is"; following "pressure" insert –is--.
Column 4, line 15, delete "that" and insert therefor –than--.
Column 4, line 22, delete "are".
Column 4, line 23, delete "moved towards each other witch" and insert therefor –are moved towards each other which--.
Column 4, line 30, after "In" insert –the--.
Column 4, line 36, delete "is" and insert therefor –it--.
Column 4, line 37, "extend" should read –extends--.
Column 4, line 45, "tread" should read –thread--.
Column 4, line 47, delete "will the left and right hand tread" and insert therefor –the left and right hand will thread--.

Signed and Sealed this
Third Day of September, 2013

Teresa Stanek Rea
*Acting Director of the United States Patent and Trademark Office*

CERTIFICATE OF CORRECTION (continued)
U.S. Pat. No. 8,096,562 B2

In the Claims:

Column 5, line 4, "wedge shaped" should read --wedge-shaped--.
Column 5, line 14, delete "fight" and insert therefor --right--.

UNITED STATES PATENT AND TRADEMARK OFFICE
CERTIFICATE OF CORRECTION

PATENT NO. : 8,096,562 B2
APPLICATION NO. : 12/309539
DATED : January 17, 2012
INVENTOR(S) : Bengt Johansson and Bo Birgerud Page 1 of 1

It is certified that error appears in the above-identified patent and that said Letters Patent is hereby corrected as shown below:

In the Claims:

Claim 4, Column 6, line 8, delete "dements" and insert therefor --elements--.
Claim 5, Column 6, line 11, delete "that" and "is".

Signed and Sealed this
Eighth Day of October, 2013

Teresa Stanek Rea
*Deputy Director of the United States Patent and Trademark Office*